Oct. 30, 1923.
E. E. CHAPMAN
1,472,155
WIRE ROPE SHACKLE FOR AUTOMOBILE WHEELS
Original Filed March 3, 1917
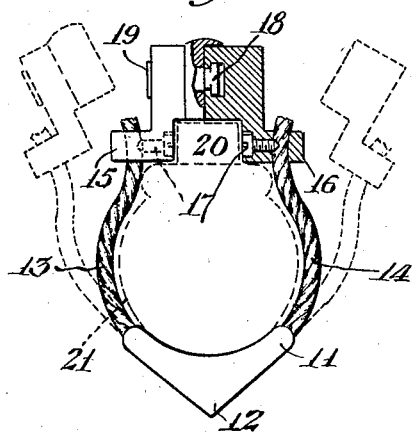
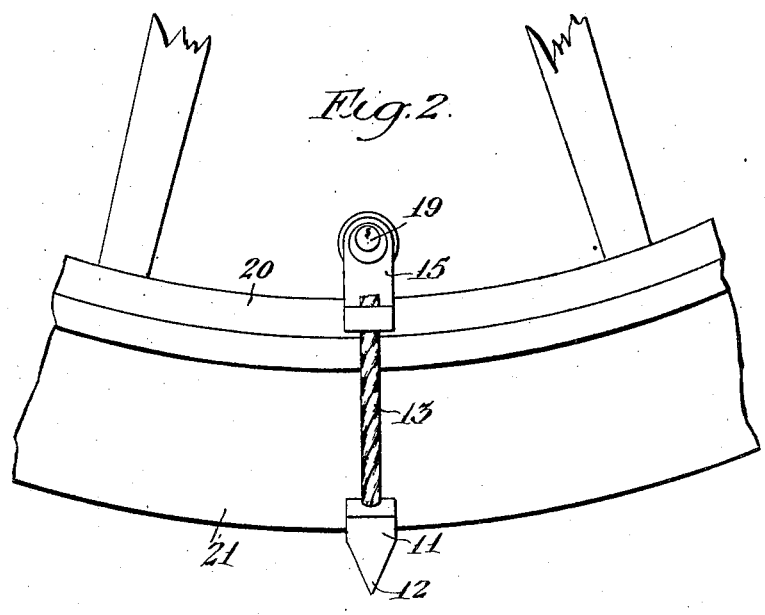
Inventor
Earle E. Chapman
by Graham + Harris
Attorneys.

Patented Oct. 30, 1923.

1,472,155

UNITED STATES PATENT OFFICE.

EARLE E. CHAPMAN, OF LOS ANGELES, CALIFORNIA, ASSIGNOR TO MILLER-CHAPMAN COMPANY, A CORPORATION OF CALIFORNIA.

WIRE-ROPE SHACKLE FOR AUTOMOBILE WHEELS.

Original application filed March 3, 1917, Serial No. 152,213. Divided and this application filed March 2, 1920. Serial No. 363,088.

*To all whom it may concern:*

Be it known that I, EARLE E. CHAPMAN, a citizen of the United States, residing at Los Angeles, Los Angeles County, and State of California, have invented a new and useful Improvement Comprising Wire-Rope Shackles for Automobile Wheels, of which the following is a specification.

My invention relates to shackles which are adapted to be secured about the wheel of an automobile for the purpose of preventing theft or unauthorized use thereof. Such shackles are ordinarily secured about one of the front wheels being locked there around so that the shackle is difficult to remove and so that they will produce an unmistakable sound and make a plain trail in case the automobile is operated with the shackle in place thereon.

An object of the invention is to provide a shackle for this purpose which will make an unmistakable sound, preventing the automobile from running at a high speed, and which will also leave a distinctive mark on the surface of the street in case the automobile is driven with the shackle in the place on the wheel thereof. For this purpose I provide a bumping member which is secured on the tread of a tire and provided with a sharp projection so placed as to dig into the street if the automobile is moved with the shackle in place.

A further object of my invention is to provide a shackle which may be adjusted to suit different diameters of tire in different sizes of felly.

Referring to the drawing which is for illustrative purposes only, Fig. 1 is a view of a cross section through a tire with the shackle in place thereon.

Fig. 2 is a side elevation of same.

In the form of the invention illustrated in the drawing a bumping member 11 is provided with the pointed projection 12 which is of proper shape to leave a distinctive mark on the surface of the street in case the automobile is operated with the shackle in place thereon.

Secured in the member 11 at either end thereof are wire rope members 13 and 14, these members being preferably formed of hardened steel so they cannot be readily cut or broken. Each of these wire rope members passes through a hole in one of the heads 15 and 16, being secured therein by a set screw 17 which is inserted from the inner side so it cannot be tampered with except when the shackle is on the wheel. The heads 15 and 16 are locked together by a bolt 18 controlled by a lock 19.

In practice the members 13 and 14 are made sufficiently long for the largest diameter of tire with which they are likely to be used. When the shackle is sold, however, the dealer adjusts the members 13 and 14 to the size of tire for which they are to be used, that adjustment being accomplisehd by loosening the set screw 17 and moving the members 13 and 14 into the proper position in the heads 15 and 16. It will be noted that the felly 20 of the wheel fits up inside the heads 15 and 16 thus preventing them from being rotated with the block 11 in place on the tire 21.

This application is a division or my application Serial No. 152,213, filed March 3, 1917, and entitled Improvement in vehicle shackles.

I claim as my invention:

1. A shackle for an automobile wheel comprising a bumping block; two flexible wire arms, one secured to one side of said block and the other secured to the other side of said block; two heads each secured to the other end of one of said wire arms; and means for locking said heads together.

2. A shackle for an automobile wheel comprising a bumping block; two flexible arms formed of wire rope, one secured to one side of said block and the other secured to the other side of said block; two heads each secured to the other end of one of said wire arms; and means for locking said heads together.

3. A shackle for an automobile wheel comprising a bumping block; a projection forming a portion of said bumping block, said projection being so shaped that it will leave a plain mark in the surface of the street if the wheel of the automobile is rotated with the shackle in place thereon; two flexible wire arms, one secured to one side of said block and the other secured to the other side of said block; two heads each secured to the other end of one of said wire arms; and means for locking said heads together.

4. A shackle for an automobile wheel comprising a bumping block; a projection forming a portion of said bumping block, said projection being so shaped that it will leave a plain mark in the surface of the street if the wheel of the automobile is rotated with the shackle in place thereon; two flexible arms formed of wire rope, one secured to one side of said block and the other secured to the other side of said block; two heads each secured to the other end of one of said wire arms; and means for locking said heads together.

5. A shackle for an automobile wheel comprising a bumping block fitting over a tire secured on said wheel and having a projection extending outwardly beyond the tread of said tire, said projection being of such size and shape as to permit the wheel to be freely rotated with the signal in place thereon, thus raising the wheel from the ground and imparting a marked bumping motion thereto; two flexible wire arms, one secured to one side of said block and the other secured to the other side of said block; two heads each secured to the other end of one of said wire arms; and means for locking said heads together.

6. A shackle for an automobile wheel comprising a bumping block fitting over a tire secured on said wheel and having a projection extending outwardly beyond the tread of said tire, said projection being of such size and shape as to permit the wheel to be freely rotated with the signal in place thereon, thus raising the wheel from the ground and imparting a marked bumping motion thereto; two flexible arms formed of wire rope, one secured to one side of said block, and the other secured to the other side of said block; two heads each secured to the other end of one of said wire arms; and means for locking said heads together.

In testimony whereof, I have hereunto set my hand at Los Angeles, California, this 25th day of February, 1920.

EARLE E. CHAPMAN.